United States Patent
Raoult

(10) Patent No.: US 12,025,374 B2
(45) Date of Patent: Jul. 2, 2024

(54) METHOD FOR THERMAL DRYING OF WOOD IN A CO$_2$ ATMOSPHERE, DRYING FACILITY FOR IMPLEMENTING SAID METHOD, AND PRODUCT OBTAINED

(71) Applicant: WAYS SAS, Samois-sur-Seine (FR)

(72) Inventor: Yann Raoult, Samois sur Seine (FR)

(73) Assignee: WAYS SAS, Samois-sur-Seine (FR)

( * ) Notice: Subject to any disclaimer, the term of this patent is extended or adjusted under 35 U.S.C. 154(b) by 569 days.

(21) Appl. No.: 17/415,917

(22) PCT Filed: Dec. 16, 2019

(86) PCT No.: PCT/EP2019/085318
§ 371 (c)(1),
(2) Date: Jun. 18, 2021

(87) PCT Pub. No.: WO2020/127026
PCT Pub. Date: Jun. 25, 2020

(65) Prior Publication Data
US 2022/0065531 A1  Mar. 3, 2022

(30) Foreign Application Priority Data

Dec. 19, 2018  (FR) ...................................... 1873302

(51) Int. Cl.
*F26B 21/14* (2006.01)
*F26B 9/06* (2006.01)
(Continued)

(52) U.S. Cl.
CPC ................ *F26B 21/14* (2013.01); *F26B 9/06* (2013.01); *F26B 21/10* (2013.01); *F26B 25/22* (2013.01); *F26B 2210/16* (2013.01)

(58) Field of Classification Search
CPC ...... F26B 21/14; F26B 21/10; F26B 2210/16; F26B 9/06; F26B 25/22
(Continued)

(56) References Cited

U.S. PATENT DOCUMENTS 942,150 A * 12/1909 Tiemann ................. F26B 21/08
34/396
3,675,600 A * 7/1972 Jones ..................... F26B 23/022
110/233

(Continued)

FOREIGN PATENT DOCUMENTS

CN 106643012 A  5/2017
CN 113874671 A * 12/2021 .............. F26B 21/06

(Continued)

OTHER PUBLICATIONS

English translation of International Search Report from corresponding PCT Appln. No. PCT/EP2019/085318, dated May 25, 2020.

(Continued)

*Primary Examiner* — Stephen M Gravini
(74) *Attorney, Agent, or Firm* — Grossman, Tucker, Perreault & Pfleger, PLLC

(57) ABSTRACT

The invention relates to a process for the thermal drying of wood using a drying plant comprising:
a drying chamber (1);
means for supplying CO2 (3) at a selected pressure and temperature;
circulation means (307, 203) for forcing the circulation of the gaseous fluid;
heating means (2) for heating the gaseous heat transfer fluid;
extraction means (4) for extracting the air inside the drying chamber 1;
metrology means (5) for measuring variations in the physical measurements of the drying plant during heating; and (Continued)

operating means (6) for controlling the means used according to programs, adapted to the quality of the dried wood sought, and processing means for readjusting the operating parameters.

10 Claims, 10 Drawing Sheets

(51) Int. Cl.
  *F26B 21/10* (2006.01)
  *F26B 25/22* (2006.01)
(58) Field of Classification Search
  USPC .......................................................... 34/396
  See application file for complete search history.

(56) References Cited

U.S. PATENT DOCUMENTS

| | | | | |
|---|---|---|---|---|
| 4,085,518 | A * | 4/1978 | Jackson | F26B 21/14 |
| | | | | 34/104 |
| 6,725,566 | B1 * | 4/2004 | Skrotsky | F26B 25/005 |
| | | | | 34/396 |
| 7,246,452 | B1 * | 7/2007 | Roy | F26B 21/10 |
| | | | | 427/393 |
| 8,857,074 | B2 | 10/2014 | Bernon et al. | |
| 11,384,980 | B2 * | 7/2022 | Triglia, Jr. | F26B 13/008 |
| 11,697,221 | B2 * | 7/2023 | Kappen | B27K 3/0271 |
| | | | | 427/212 |
| 2014/0237843 | A1 | 8/2014 | Guyomarc'h | |
| 2022/0065531 | A1 * | 3/2022 | Raoult | F26B 21/06 |
| 2023/0081670 | A1 * | 3/2023 | Rogers | F26B 25/22 |
| | | | | 241/65 |

FOREIGN PATENT DOCUMENTS

| | | | | |
|---|---|---|---|---|
| DE | 10345968 | A1 | 4/2005 | |
| EP | 2196295 | A1 | 6/2010 | |
| EP | 3899392 | B1 * | 1/2024 | F26B 21/06 |
| FR | 2786426 | A1 | 6/2000 | |
| FR | 3090835 | A1 * | 6/2020 | F26B 21/06 |
| JP | 2005180746 | A | 7/2005 | |
| WO | 2005116551 | A1 | 12/2005 | |
| WO | 2016162591 | A1 | 10/2016 | |
| WO | WO-2020127026 | A1 * | 6/2020 | F26B 21/06 |

OTHER PUBLICATIONS

English translation of Written Opinion from corresponding PCT Appln. No. PCT/EP2019/085318, dated May 25, 2020.

\* cited by examiner

METHOD FOR THERMAL DRYING OF WOOD IN A $CO_2$ ATMOSPHERE, DRYING FACILITY FOR IMPLEMENTING SAID METHOD, AND PRODUCT OBTAINED

CROSS-REFERENCE TO RELATED APPLICATIONS

This application is a 371 application of International Application No. PCT/EP2019/085318 filed Dec. 16, 2019; which claims the benefit of the filing date of French Application No. 1873302 filed Dec. 19, 2018, all of which are hereby incorporated by reference in their entirety.

This invention relates to a process for the thermal drying of wood in a CO2 atmosphere, in particular but not limited to the industrial drying of timber, roundwood and/or logs. It also relates to a plant for carrying out said drying process and to the product obtained.

Timber, roundwood and logs are defined here as wood intended for use in the secondary wood processing industry, in particular for industry, construction, carpentry, or for exterior and interior urban, industrial, collective and domestic furnishing.

Although various solutions for drying timber, roundwood and/or logs exist, the known solutions rarely allow for an industrial application with a low energy balance. Indeed, the known solutions are generally used on a small scale, due to the problem of consuming minimum energy while obtaining wood with a low water content.

Another disadvantage of the existing solutions is the duration of the drying process, which is often several days long, a factor that limits their effective use for industrial purposes.

In addition, current processes too often struggle to achieve the objective of raising the temperature so that it is homogeneous to the core of a wood mass, while achieving a low residual moisture of the dried wood and ensuring the integrity of the internal structure of the wood during and after drying.

Finally, the current drying processes are generally used for wood that has been shaped into boards or previously reduced, which implies transporting the wood, as well as heavy processing before drying.

This invention overcomes these disadvantages.

It relates to a process for the thermal drying of wood using a drying plant comprising at least one drying chamber.

According to a general definition of the invention, the drying process comprises the following steps:
- injecting a coolant gas comprising CO2 at a selected pressure and temperature into the drying chamber;
- forcing the circulation of the coolant gas through the drying chamber;
- heating the coolant gas circulating in the drying chamber according to a first phase bringing the average temperature of the drying chamber from the ambient temperature to 80° C. according to a selected temperature gradient in order to extract the free water from the wood, then a second phase from 80° C. to 140° C. according to the specific drying profile of the wood to be dried, which comprises a specific temperature increase profile and allows the extraction of the bound water specific to the wood to be dried;
- extracting the binary gas mixture comprising CO2 and water in the form of steam at high temperature from the drying chamber and discharging the water thus extracted from the wood load from the chamber;
- controlling the injection, circulation, reheating and evacuation stages according to programs, set values and appropriate drying times in accordance with the specific hygrometric evolution curve in the heart of the wood as a function of the drying time and temperature increase sequences specific to the type of wood to be dried; and
- collecting all the data formed by the variations in physical metrological measurements, comparing them with the set values dictated by the specific profile of the wood to be dried, and readjusting the operation of the drying plant in the event of deviation from the set values.

Thus, the drying process makes it possible to obtain rapid drying of the wood, which is also less energy-intensive, and makes it possible to obtain a moisture content of the dried wood of less than 5%, while allowing adaptability to any type of wood due to the monitoring, control and feedback stages.

The drying process uses a coolant gas flow generation of $CO_2$ injected into the drying chamber of the wood load at atmospheric pressure, followed by a two-stage and gradual closed-loop heating up to a target value, with a monitoring system of numerous physical measurements among which the recording of pressure, hygrometry, temperature, mass of the drying chamber at different points and connected to a feedback loop allowing the adjustment of the operation of the plant to obtain the optimal conditions of drying of wood.

Such a drying process has the advantage of being time-efficient, reproducible on a large scale for industrial use, energy-efficient and allows a water content of the dried wood of 5% or less to be achieved at moderate temperatures.

The type of wood suitable for the process and its implementation device belongs to the group formed by round wood, logs, lumber, and shaped wood in planks.

The process according to the invention comprises a CO2 injection step, which consists of extracting atmospheric air from drying chamber 1, injecting CO2 at a selected rate, followed by starting continuous recirculation at low speed. The CO2 injection step continues by recording and counting the CO2 atmosphere renewal rate in chamber 1, and finally reducing the CO2 injection rate to a set value while increasing the continuous CO2 recirculation rate until a nominal rate is reached.

According to a particular mode of implementation of the invention, the drying process also comprises a CO2 recycling step, allowing the recovery of CO2 from the water vapor/CO2 gas mixture extracted from the chamber (1) during drying.

In practice, the reheating step comprises the following sub-steps:
- starting the thermostatic heating control programme;
- increasing the temperature of the drying tube from room temperature to 80° C. for 10 hours (6° C./h);
- increasing the temperature of the drying tube from 80° C. to 140° for 60 hours (1° C./h);
- checking the internal pressure, the partial pressure of water and CO2, the temperature of the wood load at its sapwood and heartwood level, the temperature of the air in the drying chamber, the mass of the drying chamber tube, the humidity, the flow rate and volume of CO2, and the rate of renewal of the CO2 air at any time during the heating process and modulating the appropriate parameter to maintain the set values; and
- stopping the heating when the moisture content of the wood has reached a target value or when the average temperature of the drying chamber reaches 140° C.

The heating step according to the invention is carried out at atmospheric pressure, with a mass percentage of CO2 gas in the chamber to be between 95% and 100%.

In practice, the drying stage comprises the following sub-steps:
reduce the temperature of the chamber.
stop the CO2 supply when the wood temperature is below 60° C.;
stop the continuous CO2 recirculation system;
completely remove the internal air from the drying chamber (1);
stop the records of physical measurements of the installation; and
stop and standby As a non-limiting example, the target moisture content of the wood dried by the process is 5% or less.

The invention also relates to a drying plant for carrying out the drying process according to the invention.

Further advantages and features of the invention will become apparent from the description and the drawings in which.

Figure 5:
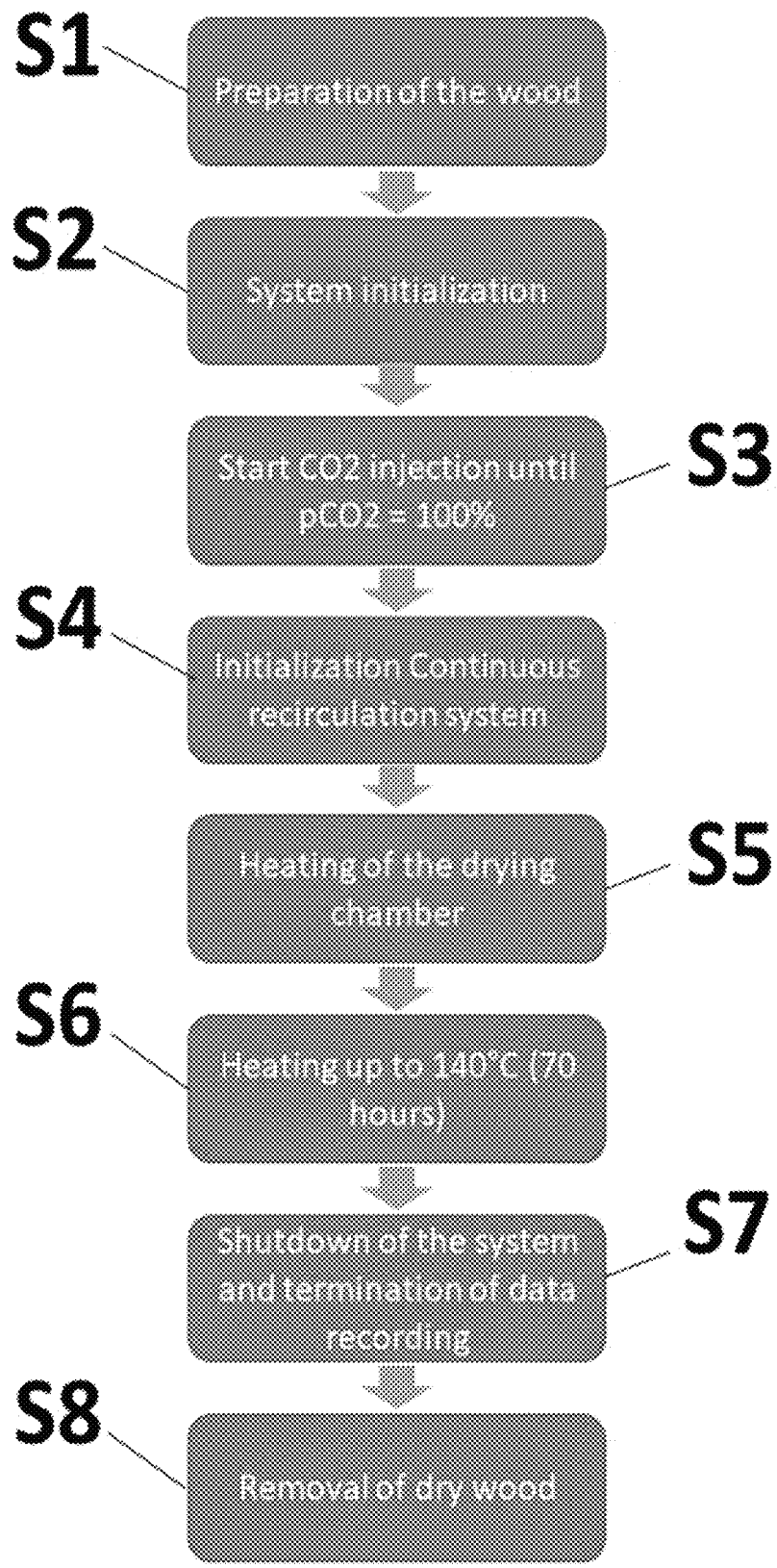
Figure 6:
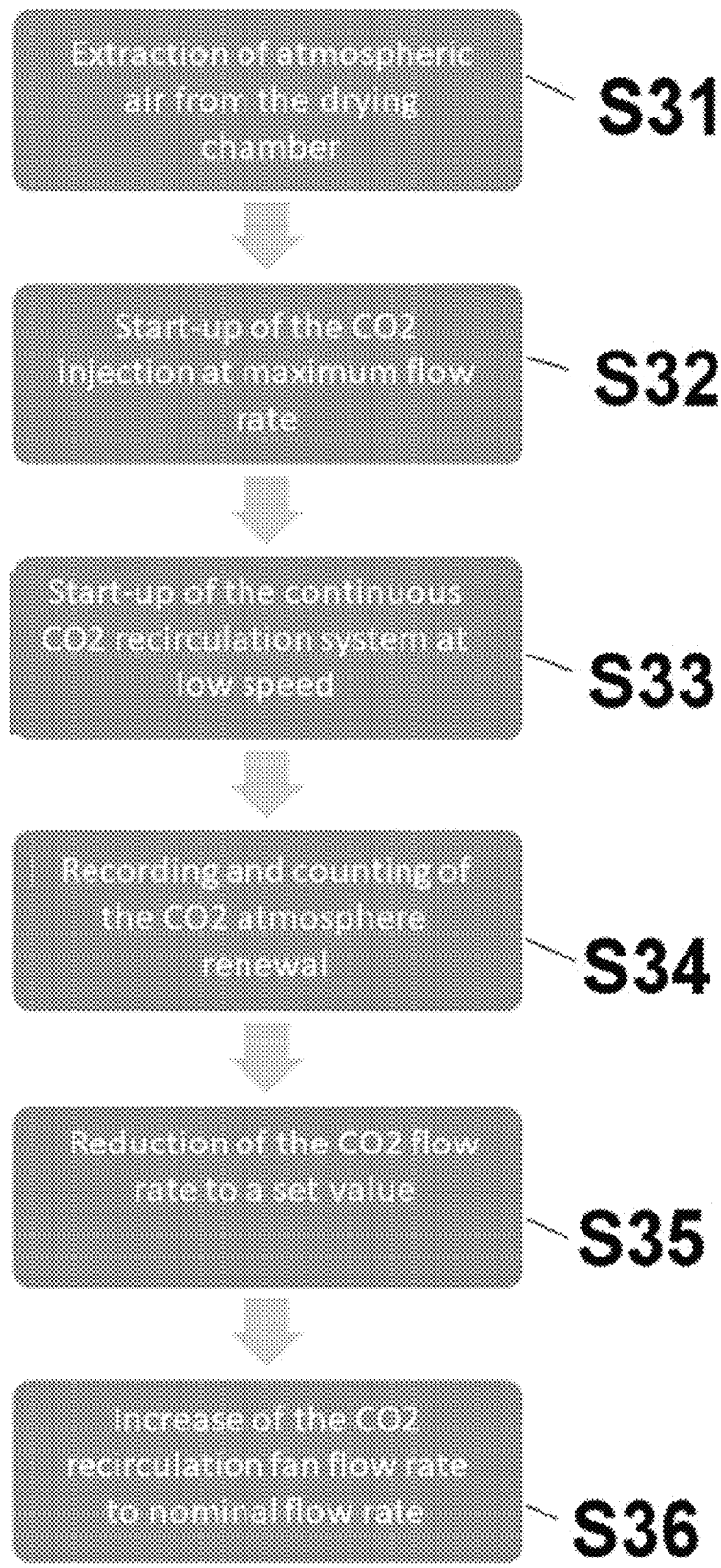
Figure 7:
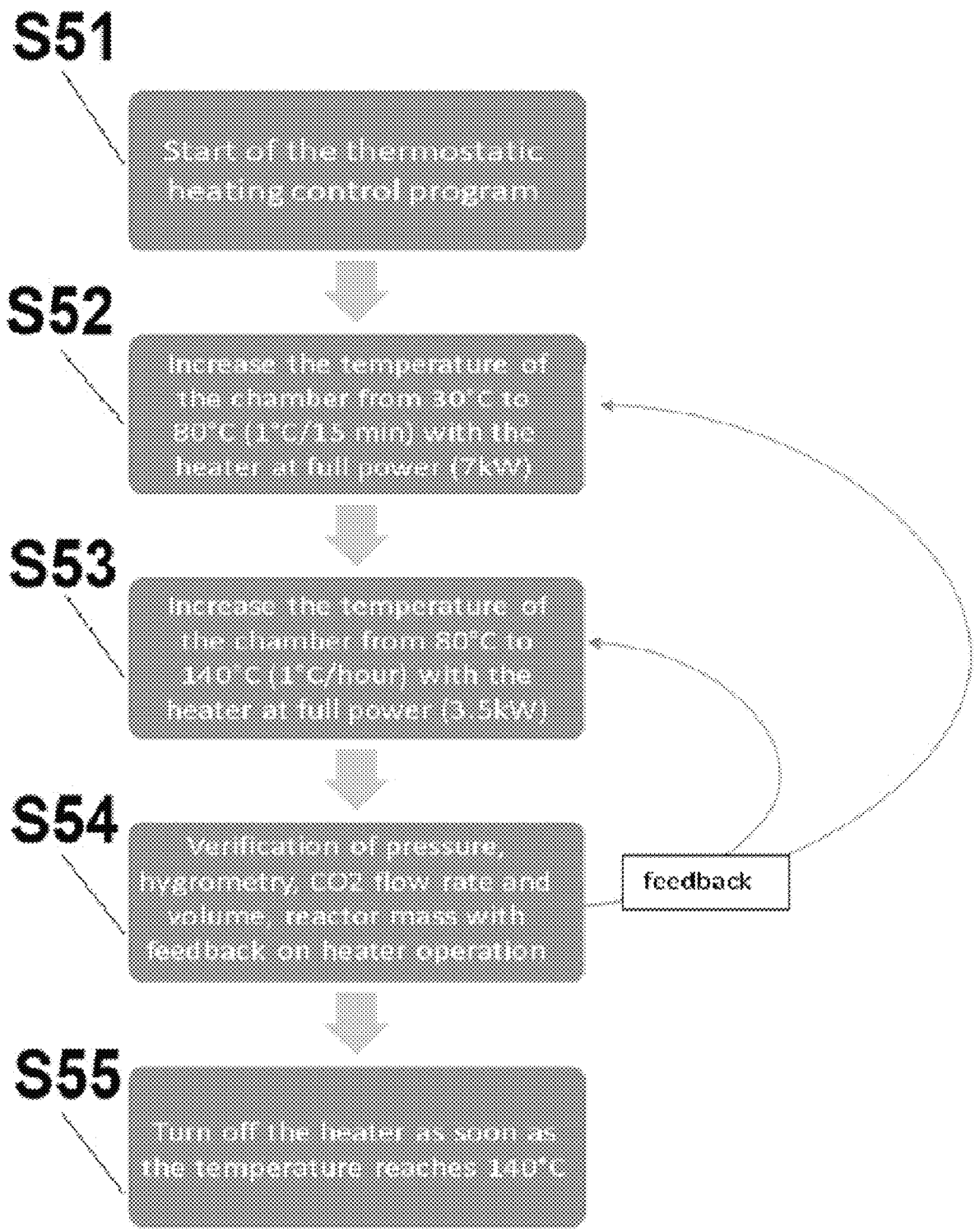
Figure 8:
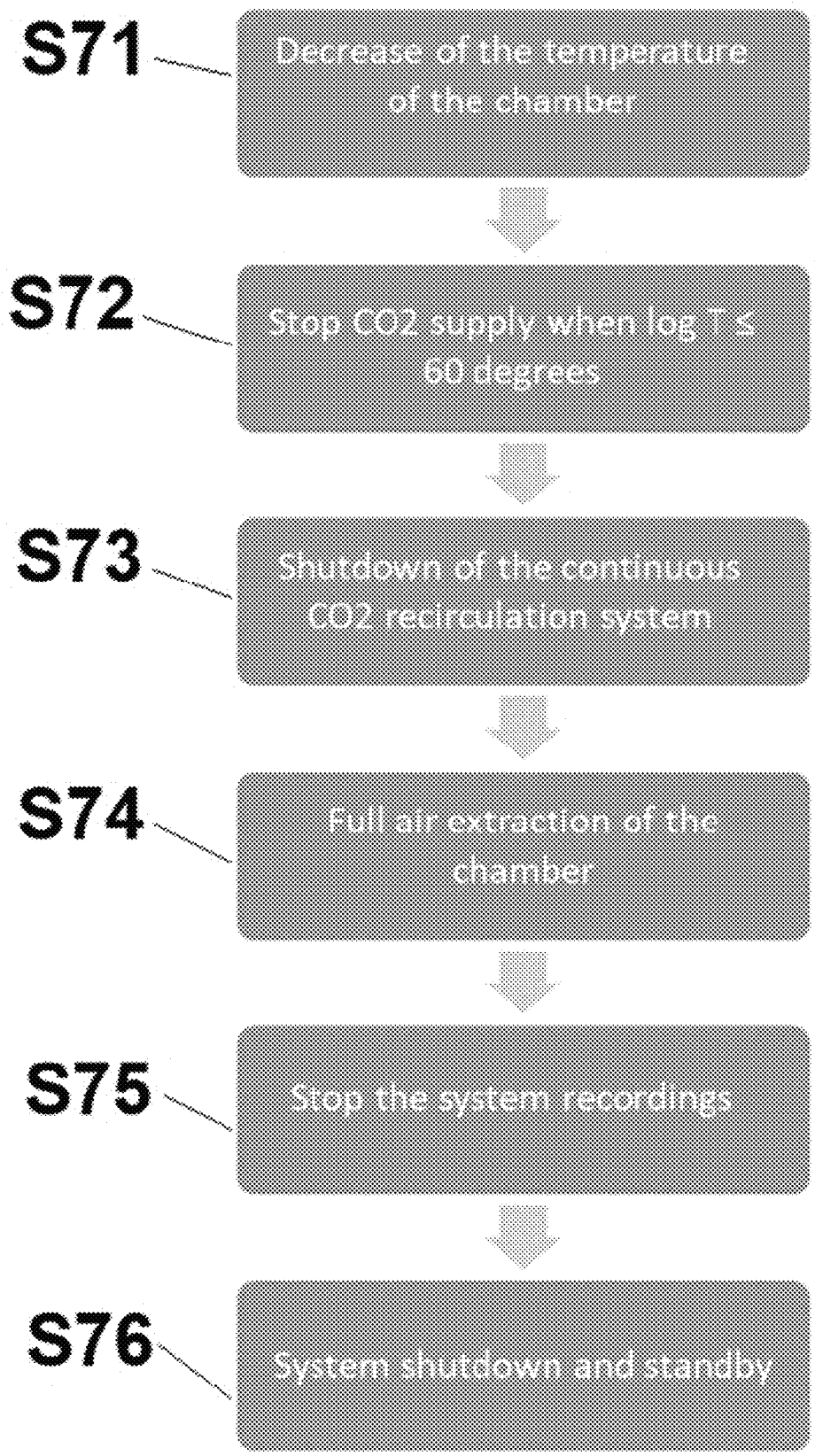

FIG. 5 schematically represents the general steps of the drying process according to the invention;

FIG. 6 shows schematically the sub-steps for the preparation of the CO2 injection and the initialization of the drying according to the invention;

FIG. 7 shows schematically the sub-steps for carrying out the heating and termination of heating step according to the invention; and FIG. 8 schematically represents the sub-steps allowing the end of the drying cycle as well as the shutdown of the plant according to the invention.

Figure 9:
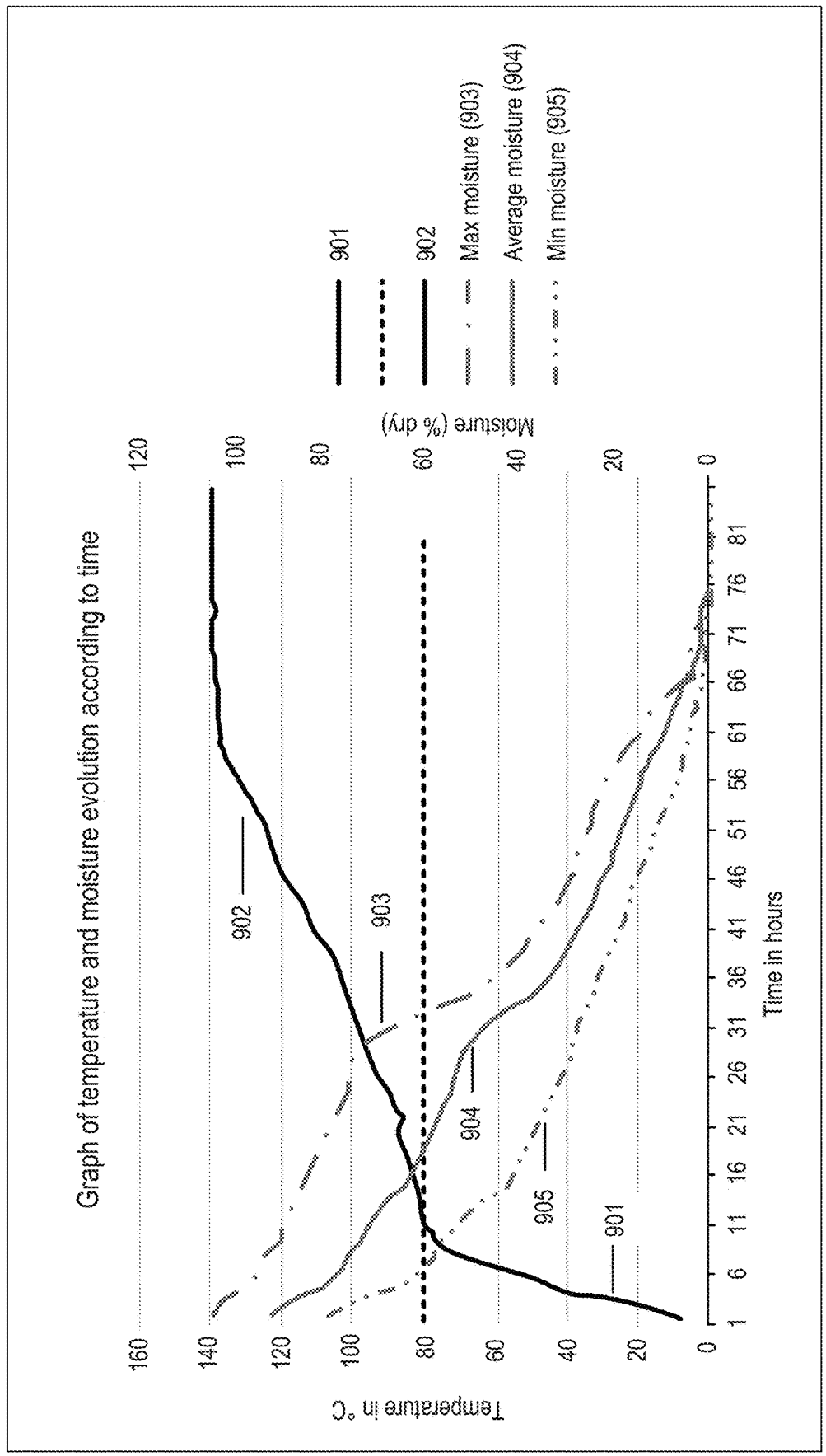

FIG. 9 shows a particular hygrometric profile of the evolution of the humidity and temperatures of the air in the drying chamber over time according to the process described in the invention.

Figure 10:
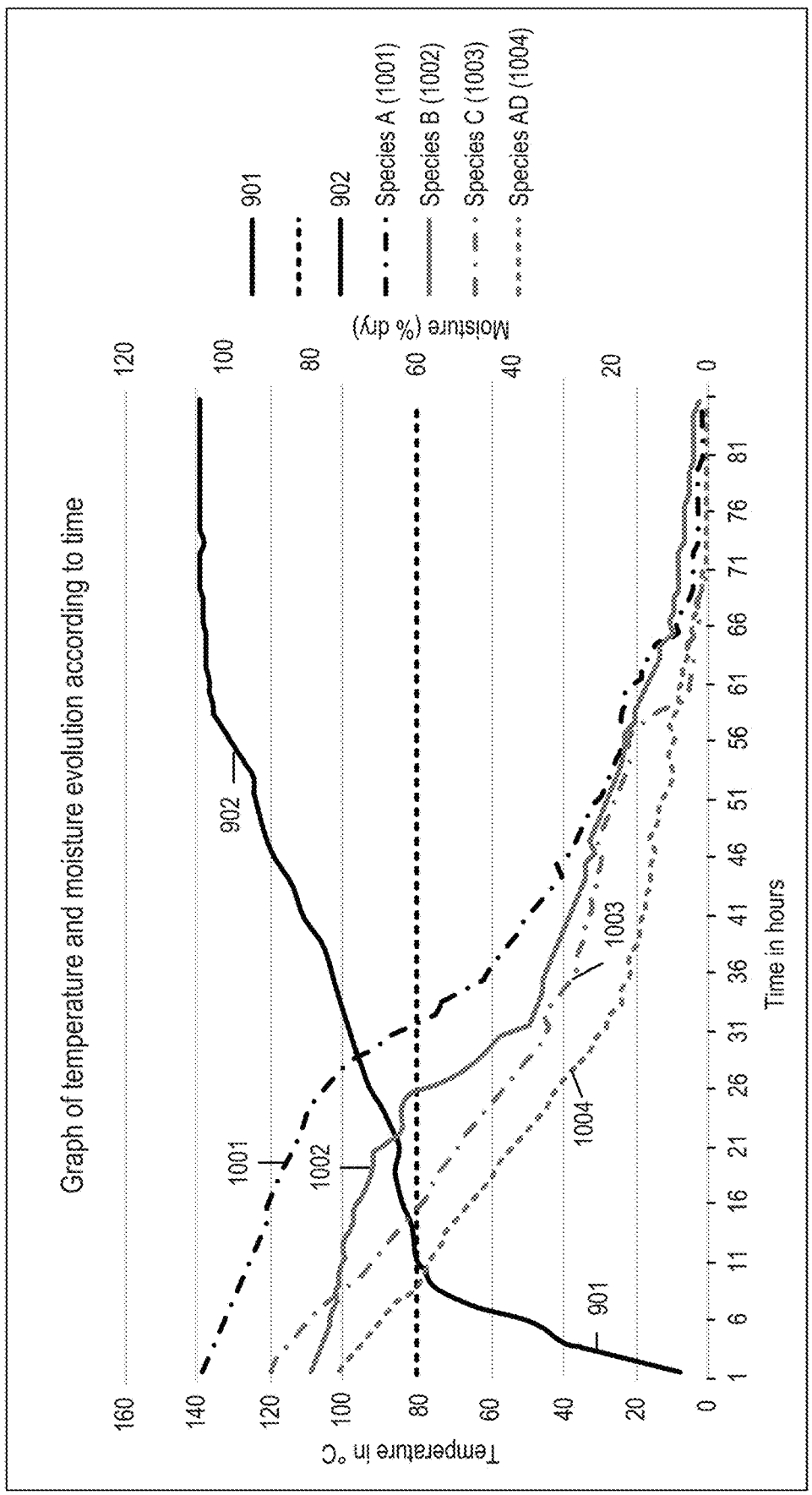

FIG. 10 shows several specific moisture profiles of different species representing the evolution of the average moisture of the wood with time and temperature of the air in the drying chamber according to the process of the invention.

With reference to FIGS. 1, 2, 3 and 4, the drying plant according to the invention comprises several functional units, including a heating chamber 1 comprising at least one drying tube into which the wood to be dried is introduced, at least one heating system 2, at least one CO2 supply system 3, at least one air extraction system 4 for extracting the air from the interior of the drying chamber 1, several metrological measuring units 5, and finally a computer control system 6 equipped with a PLC application programming interface.

In one embodiment, the plant has a drying chamber 1 consisting of one or more hollow cylindrical drying tubes for introducing the round wood to be dried. This drying chamber 1 contains an inlet 101, which is connected to a so-called ventilation duct comprising a non-return valve 101a followed by a solenoid valve 101b for ventilation of the chamber 1, which enables the injection of air from outside the plant into the drying chamber 1.

The drying chamber 1 further comprises an outlet 102 to an extraction system 4, controlled by an outlet solenoid valve 102a, also having a temperature sensor 505 and allowing extraction of the air present in the drying chamber 1. A safety valve (103) located in the middle of the drying chamber (1) and connected to the duct of the extraction system (4) allows the emergency evacuation of a part of the air contained in the drying chamber (1) in the event of a critical pressure in the latter. In practice, the critical pressure at the valve may be 0.02 bar.

Finally, the drying chamber also includes metrological instruments 5, allowing the measurement of various physical characteristics. The instruments included in the drying chamber 1 are for example:
four individualized load cells 503a/503b/503c/503d, distributed under the chamber and allowing the mass of the drying tube to be monitored, and thus the mass of the wood load being dried to be known, indicating the state of progress of the drying process;
six individualized temperature transmitters placed on the wood, three of which are placed in the centre of the log 501a/501b/501c as well as three placed at the periphery of the log 502a/502b/502c, thus allowing precise monitoring in real time of the temperature at several points of the chamber 1, as well as in the load of wood, in order to avoid damaging the log during drying and to optimize the drying process by means of fine regulation;
three individualized hygrometer/thermometer assemblies located upstream 504a, centrally 504b, and downstream 504c in the drying chamber 1;
a pressure transmitter 506a and manometer 506b for recording the pressure inside the drying chamber 1.

Each metrological measurement has a set value or a group of set values to be respected, specific to each type of wood.

As a non-limiting example, the drying chamber 1 comprises a closed, heat-insulated 2000 liter tube with internal atmospheric recirculation. For example, the reactor consists of:
a 5.5 meter long steel tube, closed by two steel plates (not shown) of 700 mm diameter and 3 mm thickness, one bolted to flanges with 1 inspection port closed by a 220 mm diameter steel plate bolted to a flange, and the other equipped with a hinged door bolted to a flange on hinged studs, with an inspection port, and finally closed by a valve;
a roller track (not shown) consisting of a series of ten 4 cm diameter, 15 cm long rollers spaced at 70 cm intervals and secured by bolt-on plates; and
a threaded end closed by bolt-cap, for the placement of the sensors, at the ends and in the centre, fixed on the axis of the upper generatrix of the chamber.

The drying plant also comprises a heating system 2, equipped with a duct 204 comprising an inlet 201 for the circulation of gas coming from the upstream part of the drying chamber 1, the duct 204 then leading to a continuous recirculation system 203 or continuous recirculation fan comprising a sheath 203a, a turbine 203b, as well as an inlet 203c and an outlet 203d allowing the circulation of the gas mixture coming from the chamber 1 in direction F in the heating system 2, then to a heater 205 or heating cell, which evacuates the air thus heated towards an outlet 202 leading into the drying chamber 1.

In a first alternative embodiment, the drying chamber 1 consists of a multitude of drying tubes, connected to a heating system 2 shared by the drying tubes.

In a second alternative embodiment, the drying chamber 1 consists of a multitude of drying tubes, connected to a number of heating systems 2.

In practice, the heater 205 is an immersion heater sold under the reference "electric heater 237537 with dip tube" by the company VULCANIC© with a power of 7 W and comprises an inlet 206 through which the gases to be heated enter the heater 205, an open cylindrical steel duct 208, in which an immersion heater 209 is inserted and fixed to one of the openings, and finally a second outlet opening 207 for the gases thus heated. A thermostat 210 for regulating the temperature of the immersion heater 209 and a temperature sensor 211 are located downstream of the pipe 208 before the outlet 207.

As a non limiting example, the heating system 2 comprises a spiral duct circuit, made of galvanized sheet steel, approximately 8 m long, supplying a reheating extraction box equipped with a helicoidal fan 203 with a low pressure motor of 9.5 $Nm^3/mn$, as well as a thermostatically controlled reheater 205 of 2×3.5 kW, all of which are insulated by a 20 cm thick glass wool casing.

In practice, the continuous recirculation fan 203 may be a single-suction, medium-pressure centrifugal fan with a duct 203b and an impeller 203a made of sheet steel, said fan comprising an impeller 203a with forwardly inclined blades made of galvanized sheet steel, the fan 203 being capable of withstanding a maximum temperature of the air to be conveyed of −20° C. to 250° C.

The drying plant also comprises a CO2 supply system, which comprises a source of anhydrous liquid CO2, constituted by a "CO2 supply unit" 301 comprising two locations for standard "Air-Liquid" type shells, each containing 34 kg of liquid CO2 compressed to 50 bar, and the corresponding expansion device(s), i.e. a CO2 gas expansion device consisting of a primary pressure reducer (not shown) allowing the pressure to be reduced from 70 bar to 3 bar (0.5 $m^3/h$), and a secondary pressure reducer/flow regulator allowing the pressure to be reduced from 3 bar to 0.3 bar (5 $m^3/h$). The supply system 3 then has a cut-off solenoid valve 304 preceded by an atmospheric CO2 metering device 302/303, the solenoid valve controlling the supply to a fixed atmospheric pipe 306, the metering device itself consisting of a manometer/thermometer 302 and volumeter/flowmeter 303 assembly. The injected and decompressed CO2 supply line then includes a non-return valve and finally joins an atmospheric circulation line 306.

The CO2 supply system 3 then includes a gas circulation device 307 for pulsing air at room temperature to heating system 2. The circulation device 307 comprises an air compressor 308 ejecting pressurized air to a pipe that splits into two, and thus the first split allows the circulation of compressed air to a pressure reducer 309 which then allows the circulation of air at reduced pressure to the solenoid valves 101b and 102a, respectively present at the inlet 101 and outlet 102 of the drying chamber 1. The second split of the pipe allows the compressed air to flow to a pressure reducing valve 310 which reduces the pressure of the injected air to a solenoid valve 311 allowing control of the amount of air introduced into the circuit, which then includes a non-return valve 312 and opens into the atmospheric circulation pipe 306 which joins the pipe 204 of the heating system 2 upstream of the recirculator 203.

In an alternative embodiment of the invention, the atmospheric circulation pipe 306 directly joins at least one tube of the drying chamber 1.

In another alternative embodiment, the CO2 source used is recycled CO2 directly from the recovery and cleaning of emissions from factory stacks.

The drying plant also comprises an extraction system 4 of the air from the tubes of the drying chamber 1, which comprises a main duct 402 with an inlet 401 open to the outside, and allowing the creation of an air supply to an extractor 403, allowing the forced ventilation of the duct 402 to the outlet 405. The duct 402 has two junctions from the drying chamber 1, the first junction with the outlet duct 102 of the drying chamber 1, and the second junction with the safety valve duct 103. The extraction system 4 thus enables the air to be removed from the drying chamber 1.

The extraction system 4 of the drying plant also has an outlet 104 at the base of the chamber 1, the base having an inclination of 1%, having a solenoid drain valve 104a with a gooseneck, which allows water to be drained off in liquid form during drying.

The drying plant also incorporates a computer control system 6 comprising an API application programming interface. The application programming interface makes it possible, on the one hand, to manage the sending of instructions to each of the components of the plant and, on the other hand, to integrate the data received by the various metrological measuring instruments in order to adjust the instructions sent to the plant's components.

According to a particular embodiment, the drying plant according to the invention comprises a CO2 recycling system allowing the separation of the water vapor and the gaseous CO2 present in the air extracted from the chamber 1 during the drying process, in order to be able to eliminate the water while recovering the CO2 in order to be stored, or to be directly reused in the plant.

As a non-limiting example, a condensation recycling system is used, reducing the temperature of the binary water vapor/CO2 gas mixture extracted from the drying chamber 1 to a temperature t, allowing the water in the mixture to condense, which is then recovered by gravity in liquid form and disposed of.

For example, the recirculation system (not shown) allows the drying of the internal air extracted from the drying chamber 1 by means of a cold-wall thermal water vapor condensation system equipped with a heat exchanger. The system therefore allows the recycling of the dehydrated air, which is either pure CO2 or dehydrated air.

The CO2 gas recovered by the recycling system (not shown) can be stored or directly re-injected to supplement the "CO2 Supply Unit".

In a particular embodiment of the invention, the drying chamber 1 has a length of 5.5 m by 0.6 m radius, i.e. an internal volume of 1555 liters, the recirculation system has a length of 9 m by 0.16 m radius, i.e. an internal volume of 170 liters, and the log inserted into the chamber 1 has a maximum length of 5 m by 0.46 m radius, i.e. a volume of 1415 liters. The air in the drying chamber 1, in which the CO2 and the extracted water will circulate, has an average volume of 310 liters.

Figure 1:
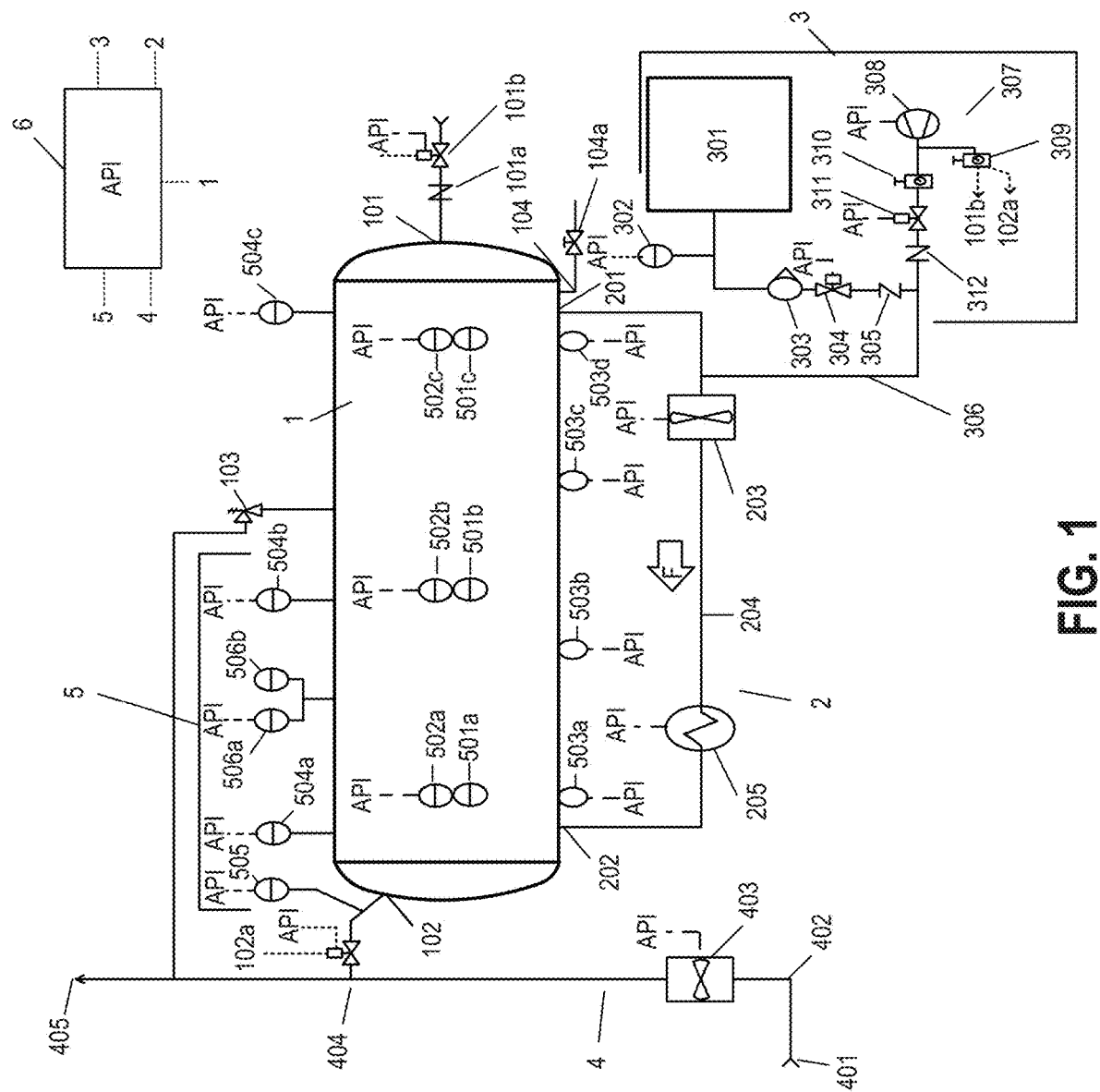
FIG. 1 shows a schematic representation of a wood drying plant according to the invention.
Figure 2:
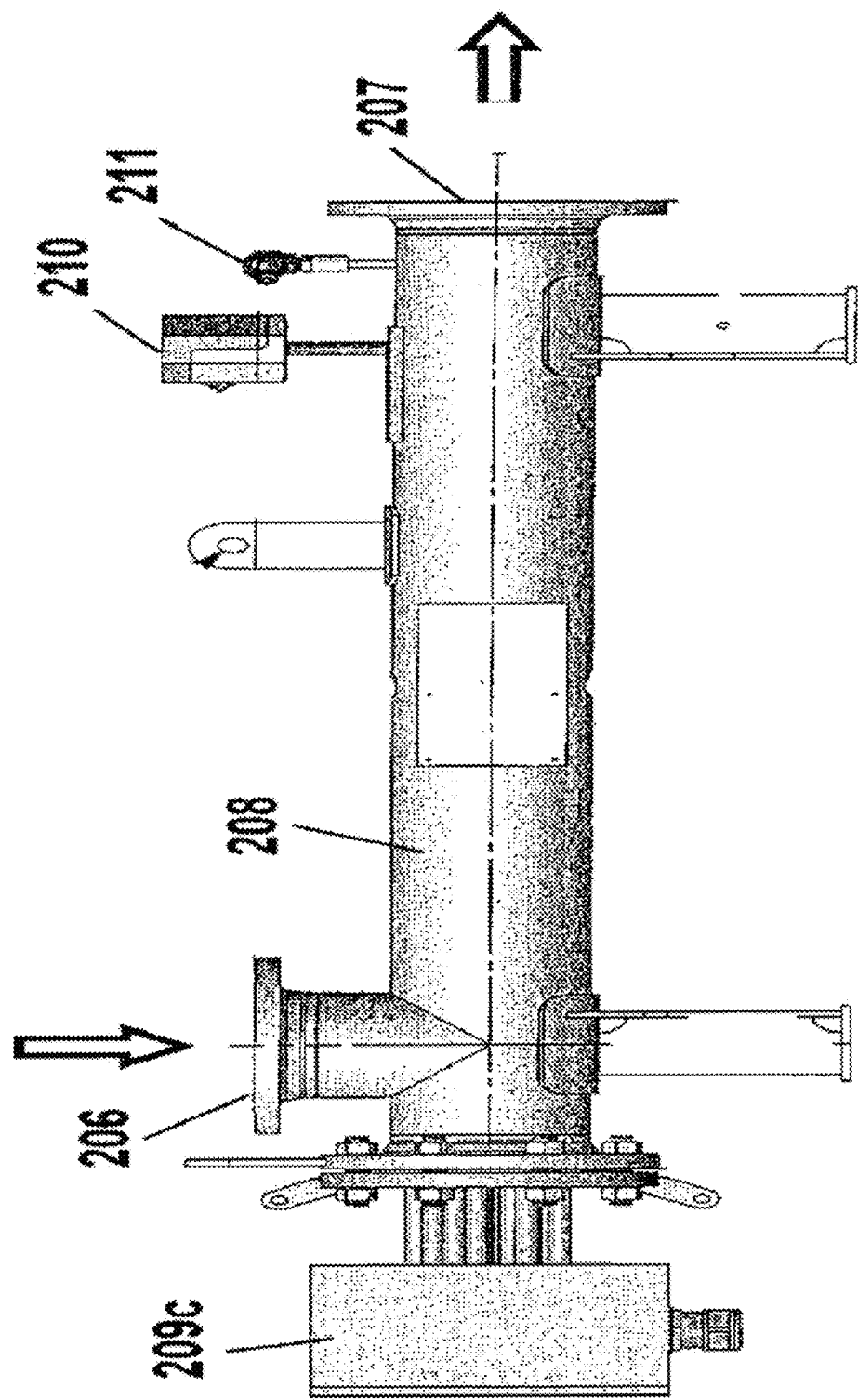
FIG. 2 shows the heating system according to the invention on its own.
Figure 3:
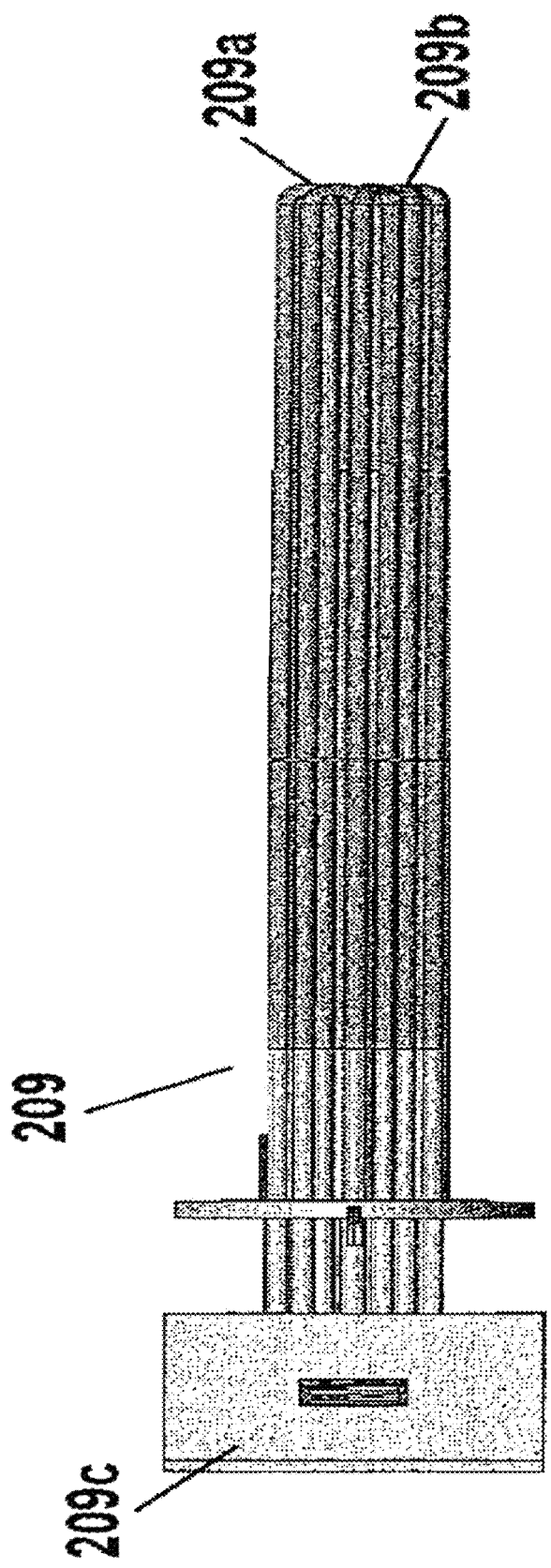
FIG. 3 shows an internal immersion heater module of the heating system according to the invention.
Figure 4:
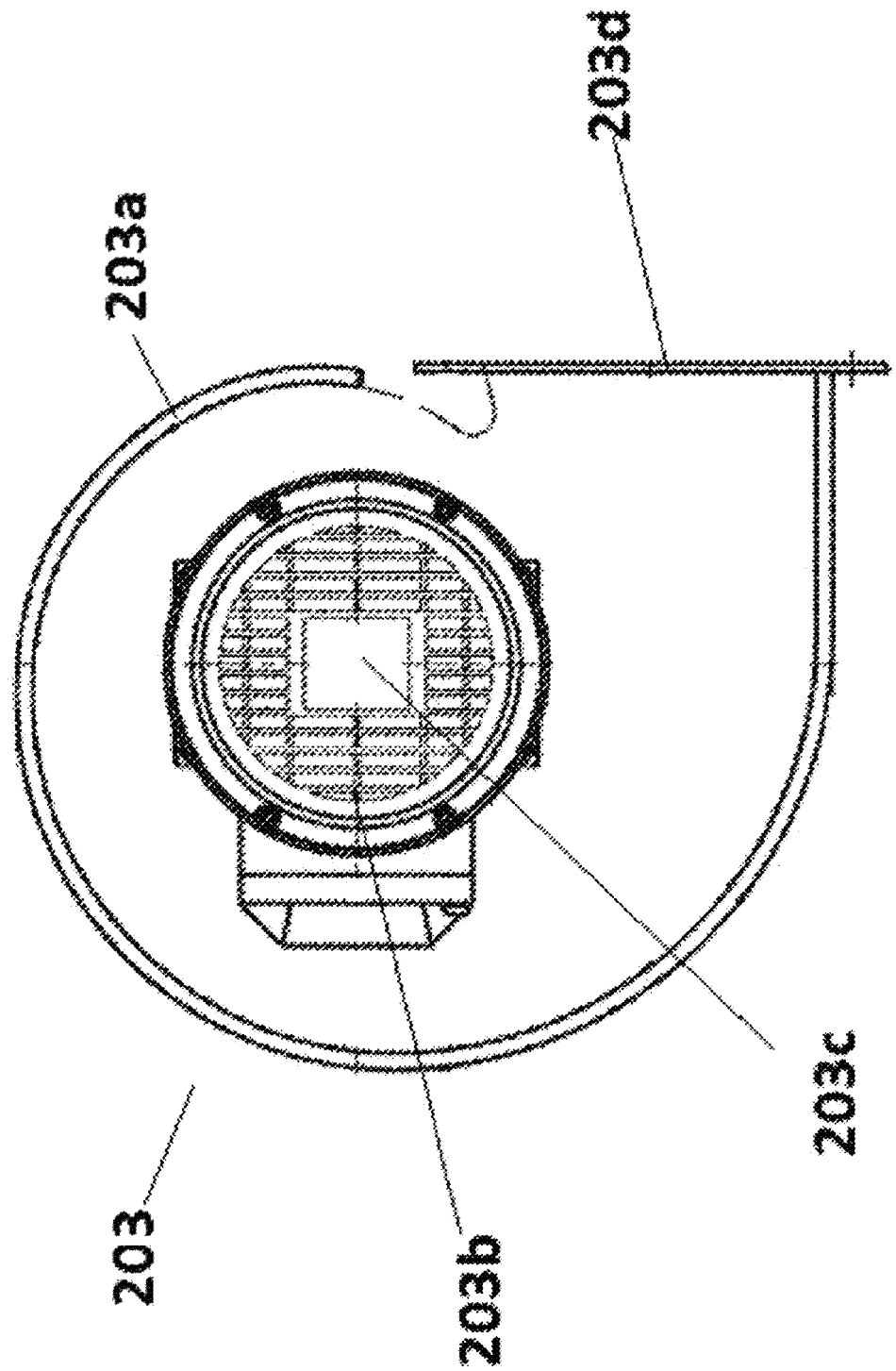
FIG. 4 shows a single-suction fan of the heating system according to the invention.

With reference to FIGS. 4 to 9, the drying plant thus described with reference to FIGS. 1, 2 and 3 implements a drying process comprising a succession of steps in the following sequence:

According to a first step of preparation of the wood or log to be dried 51, the logs are debarked and calibrated to the cylindrical template without forks or axial deformation. The size of the logs may be, but not limited to, a maximum diameter of 45 centimeters and a maximum length of 5 meters. The log is pushed onto a roller track and the semi-sealed door of the device (not shown) is closed and bolted;

According to a second initialization step S2 of the drying plant, the computer control system 6 carries out the electrical powering and operation tests of the following peripherals but not limited to: bottom piezoelectric load cells 503a/503b/503c/503d, $CO_2$ inlet 304 and outlet 102a solenoid valves, $CO_2$ continuous recirculation loop fan-extractor 203, $CO_2$ atmospheric outlet circuit fan-extractor 403, heating cell thermostat 210, heating cell resistor(s) 209, and the $CO_2$ supply flowmeter/volumeter 303;

According to a third start-up step S3 of the $CO_2$ supply system 3 and its circulation 307, the drying plant is started up;

According to a fourth initialization step of the continuous $CO_2$ recirculation system S4, the $CO_2$ consumption of the process is reduced;

According to a fifth heating step S5 of the drying chamber 1, the temperature of the $CO_2$ atmosphere is increased according to a flow rate and a chosen speed with the measurement in real time of the temperature at different points of the chamber, the hygrometry, the pressure, the partial pressures of water and $CO_2$, the heating being carried out at atmospheric pressure;

According to a sixth heating termination step S6, the heating is stopped when the maximum target temperature of the air in the drying chamber 1, i.e. 140° C. for a drying time of 70 hours, is reached or the moisture content in the wood core reaches a target value;

According to a seventh step S7, the heating system 2 is shut down and the records of the physical measurements made during heating are terminated;

In a final step S8, the dried wood is removed from the tube of the drying chamber 1.

All process steps after the wood preparation step S1 are controlled and carried out via a succession of fully automated commands by the computer control system 6 comprising an application programming interface API. The API executes a control program and sends different setpoints to each of the control components and receives data from the metrological instruments of the drying plant, which can be used to adjust the control components in order to optimize the drying process in the event of deviations from the setpoint values.

The steps of starting the S3 supply and $CO_2$ circulation systems 307, and of starting the S4 continuous recirculation system 2 advantageously comprise sub-steps enabling the process according to the invention to be implemented.

According to the first sub-step S31, the atmospheric $CO_2$ extractor 403 is started, thus allowing the extraction of atmospheric air from the drying chamber 1 at minimum flow rate.

The minimum flow rate is defined as the flow rate that allows the recirculation system 203 to renew all of the air within the drying chamber 1 in one minute, i.e. an average of 310 Liters.

As an example, the minimum flow rate is 300 liters per minute.

This step S31 is followed by a sub-step S32 consisting of starting the injection of $CO_2$ by opening the solenoid valves 304 for supplying $CO_2$ to the heating duct 204 until a saturation defined by a percentage of $CO_2$ mass value chosen in the drying chamber 1 is obtained.

According to a third sub-step S33, the continuous recirculation system of the gases present in the drying chamber 1 is started at a low flow rate, i.e. for example at 300 L/min, said start-up being triggered by the automatic start-up command of the $CO_2$ continuous recirculation fan.

Sub-step S33 is followed by a sub-step S34 of counting the $CO_2$ atmosphere renewal until the renewal rate reaches a set value, the calculated cumulative volume being automatically compared to a set value, and thus enabling a percentage mass value of the $CO_2$ in chamber 1 to be maintained between 95% and 100%.

In order to adjust the $CO_2$ atmosphere renewal rate, the drying process comprises a limitation sub-step S35, allowing the adjustment of the renewal rate and of the calculated $CO_2$ volume thanks to the reduction of the supply flow rate to a given value by triggering a first set point for reducing the opening of the $CO_2$ supply solenoid valves 304, the flow rate being monitored during its reduction and automatically compared with a minimum set point value.

According to a sub-step S36 preceding the heating step S5, the continuous recirculation system 307 receives a setpoint to automatically ramp up to the nominal operating speed of the $CO_2$ continuous recirculation fan, applying a nominal flow rate of 6000 L/min. The nominal speed is defined as the speed of the recirculation system that enables optimum recirculation of the gases in the drying chamber 1 before the start of the heating phase and thus allows direct and continuous recirculation of the $CO_2$ once heating has been initiated at the chosen flow rate.

Once the metering system 5, the $CO_2$ supply system 3 and the continuous recirculation system are operational, the process described in accordance with the invention comprises a heating step S5 and a heating termination step S6 comprising a series of sub-steps allowing optimum drying of the round wood.

According to the first sub-step S51, the thermostatic heating control programme is started, which is separated into two successive heating phases.

A first heating phase, S52, allows the average temperature of the drying chamber 1 to rise from the ambient temperature, e.g. 30° C., to a first target temperature of 80° C. The temperature rise takes place over a period of 10 hours, with the heating cell operating at full power, i.e. 7 kW, the temperature increase gradient being, for example, 6° C. per hour. In this first phase, free water is removed from the wood mass.

According to an embodiment in accordance with the invention, the control system 6 initiates the automatic start-up of the 2 heating elements of the immersion heater 209.

A second heating phase S53 starts when the average chamber temperature reaches 80° C. This second heating phase is carried out with the heater 205 operating at reduced power, i.e. 3.5 kW, for a period of 60 hours, the temperature increase taking place at a rate of, for example, 1° C. per hour, in order to regulate more finely the drying itself, the structural integrity of the wood to be dried and the drying environment in the drying chamber 1. In this second phase the bound water is removed from the wood mass.

The second heating phase ends when the temperature reaches 140° C., or when the target moisture content of the dried wood is 5% or less.

The maximum heating temperature chosen, i.e. 140° C., allows for optimal drying efficiency by $CO_2$/$H_2O$ substitution, while strongly limiting any damage to the structural integrity of the wood being dried.

In practice, the first phase, which brings the average temperature of the $CO_2$-containing drying chamber 1 up to 80° C., allows the free water to be extracted from the wood to be dried, and the second phase, from 80° C. to 140° C., allows the bound water to be extracted from the wood to be dried.

Above 140° C., the Applicant has observed that a modification of the macromolecular compounds of the wood takes place (in accordance with the literature on the subject), with a degradation of the hemicelluloses, a cross-linking of the lignins as well as a modification of the crystalline structure of the cellulose, thus justifying that the heating according to the process in conformity with the invention has a maximum temperature of 140° C.

The drying profile is specific for each type of wood, each type of wood therefore having its own hygrometric evolution curve in the core of the wood as a function of the drying time and the associated specific temperature increase sequences, which dictate the temperature increase profile to be applied during the two heating phases, and serves as a basis for comparison with the metrological measurements recorded so that the control system 6 retro adjusts these same measurements to the set values, in order to obtain optimal drying of the wood load in an industrial manner. During each of the two heating phases, the thermostat 210 of the heater 205 as well as the systems for recording metrological measurements in real time, allow the adjustment of the power of the heater 205 by feedback effect of the thermostat 210 on the heater 205 as well as the modulation of the $CO_2$ circulation systems.

According to FIGS. 9 and 10, the temperature gradients of the first phase 901 and the second phase 902 of drying are modulated by the control system 6, so as to control the evolution of the hygrometry in the heartwood of the piece of wood during drying.

In practice, as the moisture content of the wood to be dried varies, the average moisture content 904, the minimum moisture content 905, and the maximum moisture content 903, for example, are monitored by metrological measurements.

The recording of the control of the sequences of set values associated with the observed measurements makes it possible to establish a hygrometric drying profile specific to the type of wood to be treated, and thus to define the feedback adjustments by the control system 6 for wood of the same type during subsequent drying operations, and thus to industrialize the drying process while maintaining the conservation of the macromolecular structure of the dried wood with a substitution of bound water by $CO_2$.

As a non-limiting example, the feedback adjustments made by the control system 6 are obtained by modifying the operation of the heater 205, the continuous recirculation system 203, or the drain solenoid valve 104a. These adjustments make it possible, on the one hand, to maintain a maximum temperature delta of 20° C. between the temperature recorded in the core of the wood and the temperature of the air in the drying chamber 1, and, on the other hand, to adapt the drying of a wood species to a specific profile.

FIG. 10 shows the moisture profiles of four types of wood, A 1001, B 1002, C 1003 and D 1004, each of which has a specific development according to the temperature gradient in a first phase up to 80° C. and a second phase up to 140° C.

The second heating phase allows the optimization of the substitution of $CO_2$ for $H_2O$ linked to the cellulose of the wood to be dried. This $CO_2/H_2O$ substitution ensures the "structural" molecular integrity of the "cellulose laminate", and thus the dried wood. A fine and precise multi-parameter control of the drying environment, the temperature of the wood and the drying chamber 1 is therefore necessary.

Instrumentation and control based on metrological measurements of the internal environment of the drying chamber and of the wood make it possible to avoid deterioration of the wood during drying, any drying inducing a non-avoidable shrinkage of material, although reduced by the substituted $CO_2$. In the event of poor control, the structural quality of the resulting dried wood may be significantly affected.

Cracking and sagging of the wood may occur as a result of improper handling and thus compromise the structural integrity of the dried wood obtained by the process in accordance with the invention, resulting in a product that does not comply with the invention.

According to the process in accordance with the invention, but not restrictively, the metrological measurements recorded in real time during sub-step S54 may be the following:

- the mass of the reactor, making it possible to know the mass of the wood being dried and thus to evaluate the progress of the extraction of the mass of water and thus of the drying itself;
- the flow rate and volume of $CO_2$ supply as well as the atmospheric pressure differential between water and $CO_2$, in order to make an adjustment if the amount of $CO_2$ in the drying chamber 1 is too high or not sufficient thanks to the recirculation and $CO_2$ supply systems;
- the atmospheric temperature at the outlet/evacuation of the drying chamber and the temperature of the dried wood. During the two heating phases, the average temperature of the air in the drying chamber 1 is compared with the temperature of the core of the wood as a set value, under control of the specific drying profile of the wood to be dried, applying a monitoring of the hygrometric evolution curve in the core of the wood according to the drying time and its particular sequencing of the increase of the temperature of the air in the drying chamber 1. This evolution curve broadly follows the function 1/x. If a deviation is found, and if it is higher than an acceptable value, the temperature increase is temporarily suspended until a maximum temperature differential of 20° C. between the core temperature of the wood and the temperature of the air in the drying chamber is reached, on the one hand, and, on the other hand, acceptable values are found with regard to the specific drying profile of the wood to be dried;
- the atmospheric hygrometry in the heating cell and at its outlet/evacuation; and
- the moisture content of the wood (sapwood and heartwood).

If one of these recorded values is not within a range of values initially expected at a time t during heating, the control system 6 provides feedback to adjust the value of the metrological measurement to return to a satisfactory normal set value dictated by the specific profile of each type of wood being dried.

Drying is carried out, at least for the second phase, with a mass percentage of $CO_2$ gas in the drying chamber 1 of between 95% and 100%. Once the average temperature of the drying chamber 1 reaches the maximum temperature of 140° C. or the moisture content of the wood at the heartwood level conforms to the target value, for example, but not limited to 5%.

The heating system 2 is switched off in a final sub-step S55, which includes switching off the heater resistors 205, the $CO_2$ inlet 304 and outlet 102a solenoid valves are controlled via a control sequence of the control system 6 in order to control and monitor the temperature decrease of the drying chamber 1.

The average temperature of the drying chamber 1 is defined as the average between the temperature in the drying tube and the temperature at the outlet of the chamber 102. The control system 6 then initiates the shutdown step S7, with a sub-step S71 of decreasing the average temperature of the wood to a first set value of 60° C., the system causes the shutdown of the continuous CO2 recirculation system 203, by automatically decreasing the speed of its own internal ventilation system to a low speed, e.g. allowing a flow rate of 300 L/min. At 60° C. and above, the CO2 supply is stopped by closing the CO2 inlet solenoid valve 304 and opening the vent port (not shown) to allow outside air into the drying chamber.

According to a third sub-step S73, the computer control system 6 causes the internal CO2 recirculation system 2 to stop, by automatically decreasing the speed of the recirculation system fan until it stops completely.

The control system 6 then ramps up the atmospheric extractor 403 to a nominal flow rate, e.g. 6000 L/min, and enables the complete extraction S74 of the air from the drying chamber 1.

In an alternative embodiment according to the invention, the nominal flow rate is 1000 L/min.

When the temperature of the wood reaches 40° C., the system then stops the recording of the metrological measurements S75, and when the temperature reaches 35° C., it causes the general power supply to the installations to be stopped S76 and the instrumentation standby indicator to be activated, thus shutting down the plant.

Once the system has been switched off, the wood can be removed from the heating chamber.

The resulting product is therefore a round wood, whole or in planks, defined by a target moisture content of less than 5% in the heartwood.

What is claimed is:

1. A method of thermally drying wood using a drying plant comprising at least one drying chamber, said method comprising the following steps:
   injecting a coolant gas comprising CO2 at a selected pressure and temperature into the drying chamber;
   force the circulation of the coolant gas through the drying chamber;
   heating the coolant gas circulating in the drying chamber according to a first phase bringing the average temperature of the drying chamber from the ambient temperature to 80° C. according to a selected temperature gradient in order to extract the free water from the wood to be dried, then a second phase from 80° C. to 140° C. according to the specific drying profile of the wood to be dried, which comprises a specific temperature increase profile and allows the extraction of the bound water specific to the wood to be dried;
   extracting the binary gas mixture comprising CO2 and water from the drying chamber in the form of steam at high temperature and discharging the water thus extracted from the wood load from the chamber;
   controlling the injection, circulation, reheating and evacuation stages according to programs, set values and appropriate drying times according to the specific hygrometric evolution curve in the heart of the wood depending on the drying time and the temperature increase sequencing specific to the type of wood to be dried;
   and collecting all the data formed by the variations in physical metrological measurements, comparing them with the set values dictated by the specific profile of the wood to be dried, and readjusting the operation of the drying plant in the event of deviation from the set values.

2. Method according to claim 1, characterized in that the wood belongs to the group formed by round wood, logs, timber and planked wood.

3. Method according to claim 1, characterized in that the CO2 injection step comprises the following sub-steps:
   extraction of atmospheric air from the drying chamber;
   start CO2 injection at selected flow rate;
   start continuous CO2 recirculation at low speed;
   record and count the rate of CO2 air renewal;
   reduce the CO2 injection rate to a set value; and
   increase the continuous CO2 recirculation speed to a nominal speed.

4. A method according to claim 1, characterized in that the reheating step lasts 70 hours.

5. Process according to claim 1, characterized in that it further comprises a CO2 recycling step allowing the recovery of CO2 from the water vapor/CO2 gas mixture extracted from the chamber during drying.

6. A method according to claim 1, characterized in that the reheating step comprises the following steps:
   start the thermostatic heating control program;
   increase the temperature of the drying tube from room temperature to 80° C. for 10 hours (6° C./h);
   increase the temperature of the drying tube from 80° C. to 140° C. for 60 hours (1° C./h);
   check the internal pressure, the partial pressure of water and CO2, the temperature of the chamber, the temperature of the wood load at its sapwood and heartwood level, the mass of the drying chamber tube, the humidity, the flow rate and volume of CO2, and the rate of renewal of the CO2 atmosphere at all times during the heating process and modulate the appropriate parameter to maintain the set values; and
   stop heating when the humidity of the wood has reached a target value or the average temperature of the air in the drying chamber reaches 140° C.

7. The method according to claim 1, characterized in that the heating is to be carried out at atmospheric pressure, for a mass percentage of gaseous CO2 in the chamber of between 95% and 100% at least for the second heating phase.

8. The method according to claim 1, characterized in that the step of stopping the drying process comprises the following substeps:
   decrease the temperature of the room;
   stop the CO2 supply when the wood temperature is below 60° C.;
   shut down the continuous CO2 recirculation system;
   completely remove the internal air from the drying chamber;
   stop the physical measurement records of the plant; and
   shut down and put on standby.

9. The method according to claim 1, characterized in that the target moisture content of the dried wood is 5% or less.

10. Drying plant for carrying out the process according to claim 1 comprising:
    a drying chamber comprising at least one hollow cylindrical drying tube of suitable diameter and length for drying wood of selected dimensions;

CO2 supply means for injecting into the drying chamber a heat transfer fluid in gaseous CO2 form at a selected pressure and temperature;

circulation means for forcing the circulation of the gaseous heat transfer fluid through the drying chamber;

heating means for heating the gaseous heat transfer fluid;

extraction means for extracting the air inside the drying chamber, and for extracting and discharging the gaseous coolant gas comprising CO2 and water as a vapor at temperature or as a liquid;

metrology means for measuring variations in the physical measurements of the drying plant during heating; and control means for controlling the injection, circulation, heating and evacuation means according to programs, set values and drying times appropriate to the quality of the dried wood required, and processing means for measuring, comparing and readjusting the operating parameters to the set values in the event of deviation.

\* \* \* \* \*